United States Patent [19]

Horling et al.

[11] Patent Number: 5,624,693
[45] Date of Patent: Apr. 29, 1997

[54] MOLDING APPARATUS WITH COMBINED VENTING AND FLUSHING VALVE

[75] Inventors: Timothy J. Horling, Sullivan; Timothy J. VanAckeren, New Berlin, both of Wis.

[73] Assignee: Outboard Marine Corporation, Waukegan, Ill.

[21] Appl. No.: 587,336

[22] Filed: Jan. 16, 1996

[51] Int. Cl.$^6$ ................................................. B29C 45/77
[52] U.S. Cl. ........................... 425/146; 164/305; 264/102; 425/812
[58] Field of Search ..................... 425/546, 812, 425/145, 146; 264/101, 102; 164/305

[56] References Cited

U.S. PATENT DOCUMENTS

| | | | |
|---|---|---|---|
| 4,422,840 | 12/1983 | Posch et al. | 425/812 |
| 4,538,666 | 9/1985 | Takeshima et al. | 425/812 |
| 4,691,755 | 9/1987 | Kuriyama et al. | 164/305 |
| 4,838,338 | 6/1989 | Priem | 164/113 |
| 4,987,946 | 1/1991 | Van Riet | 164/305 |
| 4,987,947 | 1/1991 | Ozeki et al. | 164/305 |

*Primary Examiner*—Tim Heitbrink
*Attorney, Agent, or Firm*—Jones, Day, Reavis & Pogue

[57] ABSTRACT

Disclosed herein is a molding apparatus comprising a mold member at least partially defining a mold cavity including a vent, a valve comprising a valve housing including a bore having a central portion with first and second axially opposite ends, a first end portion communicating with the first end of the central portion and with the vent, and a second end portion communicating with the second end of the central portion, a vent discharge port, and a flushing discharge port, and a conduit including an inlet port communicating with the first end portion of the bore, an outlet port communicating with the second end portion of the bore, and a valve member located in the bore and being operably moveable between a venting position wherein the vent communicates with the conduit inlet port, wherein the conduit outlet port communicates with the vent discharge port, wherein communication between the flushing medium outlet port and the conduit inlet port is blocked, and wherein communication between the conduit outlet port and the flushing discharge port is blocked, and a flushing position wherein the flushing medium outlet port communicates with the conduit inlet port, wherein the conduit outlet port communicates with the flushing discharge port, wherein communication between the vent and the conduit inlet port is blocked, and wherein communication between the conduit outlet port and the vent discharge port is blocked, and an actuator for displacing the valve member between the venting position and the flushing position.

21 Claims, 1 Drawing Sheet

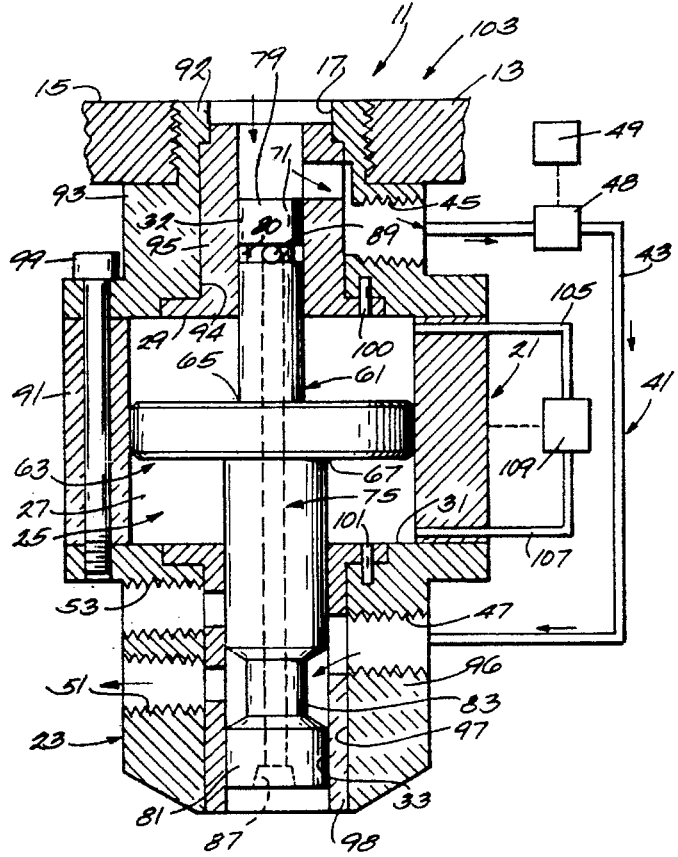

MOLDING APPARATUS WITH COMBINED VENTING AND FLUSHING VALVE

BACKGROUND OF THE INVENTION

The invention relates generally to molding apparatus and particularly to molding apparatus employing the resin transfer molding method.

The invention also relates to arrangements for venting such mold apparatus.

In the past, molding apparatus with vents commonly experienced vent fouling due to accumulation of resin debris in the vent. Furthermore, venting with manually clamped, disposable vent hoses was employed.

Attention is directed to the following U.S. Pat. Nos.:

4,691,755, issued Sep. 8, 1987
4,838,338, issued Jun. 13, 1989
4,987,946, issued Jan. 29, 1991
4,987,947, issued Jan. 29, 1991

SUMMARY OF THE INVENTION

The invention provides molding apparatus comprising a mold member at least partially defining a mold cavity adapted to at least partially define an article to be molded and including a vent, a venting and flushing valve comprising a valve housing including a bore communicating with the vent, a vent discharge port adapted to communicate with the atmosphere, and a flushing discharge port, a venting and cleansing conduit including an inlet port, and an outlet port, a flushing medium conduit adapted to communicate with a source of flushing medium and including an outlet port, and a valve member located in the bore and being operably moveable between a venting position wherein the vent communicates with the venting and cleansing conduit inlet port, wherein the venting and cleansing conduit outlet port communicates with the vent discharge port, wherein communication between the flushing medium outlet port and the venting and cleaning conduit inlet port is blocked, and wherein communication between the venting and cleansing conduit outlet port and the flushing discharge port is blocked, and a flushing position wherein the flushing medium outlet port communicates with the venting and cleansing conduit inlet port, wherein the venting and cleansing conduit outlet port communicates with the flushing discharge port, wherein communication between the vent and the venting and cleansing conduit inlet port is blocked, and wherein communication between the venting and cleansing conduit outlet port and the vent discharge port is blocked, and means for displacing the valve member between the venting position and the flushing position.

The invention also provides molding apparatus comprising a mold member at least partially defining a mold cavity adapted to at least partially define an article to be molded and including a vent, a venting and flushing valve comprising a valve housing including a bore communicating with the vent, a vent discharge port communicating with the bore, and a flushing discharge port communicating with the bore, a venting and cleansing conduit including an inlet port communicating with the bore, an outlet port communicating with the bore, and a valve member located in the bore, including a flushing medium conduit extending axially therein and including an inlet port adapted to communicate with a source of flushing medium, and an outlet port communicating with the bore, and being operably moveable between a venting position wherein the vent communicates with the venting and cleansing conduit inlet port, wherein the venting and cleansing conduit outlet port communicates with the vent discharge port, wherein communication between the flushing medium outlet port and the venting and cleaning conduit inlet port is blocked, and wherein communication between the venting and cleansing conduit outlet port and the flushing discharge port is blocked, and a flushing position wherein the flushing medium outlet port communicates with the venting and cleansing conduit inlet port, wherein the venting and cleansing conduit outlet port communicates with the flushing discharge port, wherein communication between the vent and the venting and cleansing conduit inlet port is blocked, and wherein communication between the venting and cleansing conduit outlet port and the vent discharge port is blocked, and means for displacing the valve member between the venting position and the flushing position.

The invention also provides molding apparatus comprising a mold member at least partially defining a mold cavity adapted to at least partially define an article to be molded and including a vent, a venting and flushing valve comprising a valve housing including a bore having a central portion with first and second axially opposite ends, a first end portion communicating with the first end of the central portion and with the bore, and a second end portion communicating with the second end of the central portion, a valve member located in the bore and including a piston portion movably located in the central portion of the bore in sealing engagement therewith and including axially opposite first and second ends, a first end portion extending axially from the first end of the piston portion and movably located in the first end portion of the bore and in sealing engagement therewith, and a second end portion extending axially from the second end of the piston portion, movably located in the second end portion of the bore and in sealing engagement therewith, and including a reduced diameter part communicating with the cleansing conduit outlet port and being selectively communicable with the vent discharge port and the flushing discharge port, and a flushing medium conduit extending axially through the valve member and including an inlet port located in the second end part of the valve member, and adapted to communicate with a source of flushing medium, and an outlet port located in the first end portion of the valve member and communicating with the bore, the valve member being moveable between a venting position wherein the vent communicates with the vent and cleansing conduit inlet port, wherein the vent and cleansing conduit outlet port communicates with the vent discharge port, wherein communication between the flushing medium inlet port and the vent and cleaning conduit inlet port is blocked, and wherein communication between the vent and cleansing conduit outlet port and the flushing discharge port is blocked, and a flushing position wherein the flushing medium inlet port communicates with the vent and cleansing conduit inlet port, wherein the vent and cleansing conduit outlet port communicates with the flushing discharge port, wherein communication between the vent and the vent and cleansing conduit inlet port is blocked, and wherein communication between the vent and cleansing conduit outlet port and the vent discharge port is blocked, and means for displacing the valve member between the venting position and the flushing position.

Other features and advantages of the invention will become apparent to those skilled in the art upon review of the following detailed description, claims and drawings.

DESCRIPTION OF THE DRAWINGS

FIG. 1 is a fragmentary, partially diagrammatic, and sectional view of a molding apparatus which incorporates various of the features of the invention and which includes a vent valve which incorporates valve flushing capability and which is shown in the venting position.

FIG. 2 is a view similar to FIG. 1 wherein the vent valve is shown in the flushing position.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Shown in the drawings is a molding apparatus 11 which, during the molding process, is vented to the atmosphere, or alternatively, can be connected to a suitable source of vacuum (not shown). While the features of the invention are applicable to any selectively vented molding apparatus, the disclosed construction is particularly adapted to be employed in the resin transfer molding process. Except as disclosed hereinafter, the molding apparatus 11 can be of any suitable construction.

The molding apparatus 11 comprises at least one mold member 13 at least partially defining a mold cavity 15 adapted to at least partially define an article to be molded (not shown) and including a vent or opening 17 communicating with the mold cavity 15.

The molding apparatus 11 also includes a vent or venting and flushing valve 21 which can be constructed from any suitable material and which comprises a valve housing 23 including an elongated bore 25 having a central portion 27 with first and second axially opposite ends 29 and 31, a first end portion 32 located adjacent the mold member 13, extending from the first end 29 of the central portion 27, and communicating with the vent or opening 17, and a second end portion 33 located remotely from the mold member 13 and extending in the opposite direction and from the second end 32 of the central portion 27.

The venting and flushing valve 21 also includes a vent/ cleansing or vent and cleansing conduit 41 which includes a main or central portion 43, an inlet port 45 located in the valve housing 23 and communicating with the first end portion 32 of the elongated bore 25, and an outlet port 47 located in the valve housing 23 and communicating with the second end portion 33 of the elongated bore 25. While the main portion 43 of the vent or cleansing conduit 41 can be formed in the valve housing 23, it is preferred to locate the main portion 43 exterior to the valve housing 23 and to fabricate the main portion 43 from a transparent material to provide a sight tube affording visual inspection and monitoring of resin flow in the sight tube. More specifically, use of a sight tube enables determination by an operator of the presence of outflow from the mold cavity 15 of resin.

The vent or cleansing conduit 41 can also include a sensor 48 (shown diagrammatically) which can be of any suitable construction and which is operative to sense the arrival of resin in the conduit 41. The sensor 48 can be connected to a suitable control 49 (shown diagrammatically) which is connected to the vent valve 21 to effect operation of the vent valve 21 so as to close the vent opening 17 and stop outflow of resin from the mold cavity 15.

In addition, the valve housing 23 also includes a vent discharge port 51 communicating with the second end portion 33 of the elongated bore 25 and with the atmosphere or with a vacuum source (not shown), if used, and a flushing discharge port 53 communicating with the second end portion 33 of the elongated bore 25 and with a flushing medium reservoir (not shown), thereby enabling reuse of the flushing medium.

In addition, the venting and flushing valve 21 includes a valve member 61 which can be fabricated from any suitable material, which is located in the elongated bore 25, and which, as more fully explained hereinafter, is moveable between a vent open or venting position affording outflow from the mold cavity 15 through the vent or opening 17 and a vent closed or flushing position which closes the vent or opening 17 and which affords flushing of the venting and flushing valve 21. The valve member 61 includes a piston portion 63 movably located in the central portion 27 of the elongated bore 25 and in sealing engagement therewith and including axially opposite first and second ends 65 and 67.

The valve member 61 also includes a first end portion 71 which extends axially from the first end 65 of the piston portion 63 and which is movably located in the first end portion 32 of the elongated bore 25 and in sealing engagement therewith. The first end portion 71 and the cleansing conduit inlet port 45 are located relative to each other such that, when the valve member 61 is located in the venting position, communication between the vent or opening 17 in the mold member 13 and the cleansing conduit inlet port 45 is established through the first end portion 29 of the elongated bore 25, and such that communication between a flushing medium supply conduit 75 (still to be described) and the cleansing conduit inlet port 45 is blocked.

The outlet of the flushing conduit 75 and the cleansing conduit inlet port 45 are located relative to each other such that, when the valve member 61 is in the flushing position, communication between the flushing medium supply conduit 75 (still to be described) and the cleansing conduit inlet port 45 is established, and such that communication between the vent or opening 17 and the cleansing conduit inlet port 45 is blocked.

The first end portion 71 of the valve member 61 also includes an end part 79 which is moveable, incident to movement of the valve member 61 into the flushing position, into blocking relation to the vent or opening 17 to prevent flow through the vent or opening 17 from the mold cavity 15. While other constructions are possible, in the disclosed construction, the end part 79 enters into the outer end of the first end portion 71 of the elongated bore 25 in sealing engagement therewith.

The valve member 61 also includes a second end portion 81 which extends axially from the second end 67 of the piston portion 63 and which is movably located in the second end portion 33 of the elongated bore 25 and in sealing engagement therewith. The second end portion 81 includes a reduced diameter portion 83 which is located, when the valve member 61 is in the venting position, such that the reduced diameter portion 83 communicates with the cleansing or venting conduit outlet port 47 and with the vent discharge port 51, and such that communication between the reduced diameter portion 83 and the flushing discharge port 53 is blocked, thereby permitting air flow from the mold 15 through and from the venting and cleansing conduit 41 to the vent discharge port 51 and thus to the atmosphere.

The location of the reduced diameter portion 83 (and the location of the vent and cleansing conduit outlet port 47, the vent discharge port 51, and the flushing discharge port 53) are such that, when the valve member 61 is located in the flushing position, the reduced diameter portion 83 communicates with the vent and cleansing conduit outlet port 47 and with the flushing discharge port 53, and such that communication between the reduced diameter portion 83 and the vent discharge port 51 is blocked, thereby permitting flow of flushing medium through and from the cleansing conduit 41 and to the flushing discharge port 53.

The venting and flushing valve 21 also includes the before mentioned flushing medium supply conduit 75. While other constructions can be employed, in the disclosed construction, the flushing medium supply conduit 75 which extends axially through the valve member and which includes an inlet port 87 which is located at the outer end of the second end portion 81 of the valve member 61 and which is adapted to communicate with a source (not shown) of flushing medium. In addition, the flushing conduit 75 includes one or more outlet ports 89 communicating with an annular groove 80 located on the side of the first end portion 71 of the valve member 61 such that, when the valve member 61 is in the flushing position, communication of the outlet port(s) 89 with the cleansing conduit inlet port 45 is established and such that, when the valve member 61 is in the vent open or venting position, communication of the outlet port(s) 89 with the inlet port 45 is blocked by sealing engagement of the end portion 71 with the first or inner end portion of 32 the elongated bore 25.

More specifically, while other constructions can be employed, in the disclosed construction, the valve housing 23 includes a central cylindrical member 91 which defines the central portion 27 of the elongated bore 25. The valve housing 23 also includes a first end member 93 which includes a portion 92 in threaded engagement with the mold member 13, and a bore or opening 94 which receives a bushing or collar 95 defining the first end portion 31 of the elongated bore 25. In addition, the valve housing 23 also includes a second end member 96 with a bore or opening 97 receiving a bushing or collar 98 which defines the second end portion 33 of the elongated bore 25.

Any suitable fastening means, such as the bolts 99, can be employed to assemble together the central member 91, the first end member 93, and the second end member 96 to form the valve housing 23. In addition, any suitable fastening means, such as the bolts 100 and 101, can be respectively employed to fix the bushings or collars 95 and 98 in the first and second end members 93 and 96.

While other constructions can be employed, in the disclosed construction, the valve housing 23 is fixed to the mold member 13, as already indicated, by being screw threaded into the mold member 13, as indicated generally at 103, to afford communication of the vent or opening 17 with the first end portion 31 of the elongated bore 25 and to afford blocking by the end part 79 of the valve member 61 of the vent or opening 17.

In operation, the valve member 61 is moveable between the vent open or venting position shown in FIG. 1 and the vent closed or flushing position shown in FIG. 2. When in the vent open or venting position, the vent or opening 17 in the mold member 13 communicates with the cleansing conduit inlet port 45, and the cleansing conduit outlet port 47 communicates with the vent discharge port 51, thereby permitting outflow of air from the mold cavity 15 to the atmosphere or to a vacuum source, if used. At the same time, communication between the flushing medium outlet port 89 and the cleansing conduit inlet port 45 is blocked, and communication between the cleansing conduit outlet port 47 and the flushing discharge port 53 is blocked. When resin arrives at the vent opening 17, it will flow into the first end portion 32 of the elongated bore 25 and then into the venting and cleansing conduit 41 and to the sight tube. The venting and flushing valve 21 should then be closed to prevent fouling.

When the valve member 21 is in the vent closed or flushing position, communication between the vent or opening 17 and the cleansing conduit inlet port 45 is blocked, thereby discontinuing any outflow of resin from the mold cavity 15, and communication between the cleansing conduit outlet port 47 and the vent discharge port 51 is blocked. At the same time, the flushing medium outlet port 89 communicates with the cleansing conduit inlet port 45, and the cleansing conduit outlet port 47 communicates with the flushing discharge port 53, thereby permitting flushing of the sight tube and the area in the vicinity of the first end portion 71 of the valve member 61 adjacent the vent opening 17.

In this regard, air or a solvent can then be passed through the flushing conduit 75 and through the vent or cleansing conduit 41 to cleanse or flush the vent valve 21, thereby readying the vent valve 21 for the next mold cycle.

Any suitable mechanism or means or actuator can be employed for displacing the valve member 61 between the venting position and the flushing position. More specifically, any hydraulic, pneumatic, mechanical, or electrical mechanism can be employed. In the disclosed construction, fluid conduits 105 and 107 are connected to the spaces on opposite sides of the main piston portion 63 and to a suitable, remotely located, actuating valve 109 (shown diagrammatically) for communication with a suitable source of pressure fluid (not shown), preferably pressure air.

As a consequence of the construction disclosed above, selective venting of the mold cavity 15 and cleansing of the venting and flushing valve 21 and the sight tube is provided. More specifically, venting of the mold cavity 15, either by displacement of the air in the mold cavity 15 incident to the entry of resin into the mold cavity 15, or by reason of applied suction, or by the combined action of mold cavity air displacement and suction can be obtained and, alternatively, the venting and flushing valve 21 and the cleansing conduit 41 can be cleansed by any suitable flushing medium to prevent build up of resin debris in the venting and flushing valve 21 and in the cleansing conduit (sight tube) 41.

The disclosed construction enhances manufacturing when using the resin transfer process by providing molding apparatus 11 which allows the mold cavity 15 to be vented or vacuumed, without fouling of the vacuum source, if used, and which also permits remote actuation of the vent valve 21 between the vent open or venting position and the vent closed or flushing position. Furthermore, the disclosed construction enables cleaning of the vent valve 21 when the vent valve is in the vent closed (flushing) position, thereby minimizing opportunity for fouling of the vent valve by reason of resin flowing out of the vent opening 17.

Various of the features are set forth in the following claims.

We claim:

1. Molding apparatus comprising a mold member at least partially defining a mold cavity adapted to at least partially define an article to be molded and including a vent, a venting and flushing valve comprising a valve housing including a bore communicating with said vent, a vent discharge port adapted to communicate with the atmosphere, and a flushing discharge port, a venting and cleansing conduit including an inlet port, and an outlet port, a flushing medium conduit adapted to communicate with a source of flushing medium and including an outlet port, and a valve member located in said bore and being operably moveable between a venting position wherein said vent communicates with said venting and cleansing conduit inlet port, wherein said venting and cleansing conduit outlet port communicates with said vent discharge port, wherein communication between said flushing medium outlet port and said venting and cleaning conduit inlet port is blocked, and wherein communication between said venting and cleansing conduit outlet port and said flushing discharge port is blocked, and a flushing position wherein said flushing medium outlet port communicates with said venting and cleansing conduit inlet port, wherein said venting and cleansing conduit outlet port communicates with said flushing discharge port, wherein communication between said vent and said venting and cleansing conduit inlet port is blocked, and wherein communication between said venting and cleansing conduit outlet port and said vent discharge port is blocked, and means for displacing said valve member between said venting position and said flushing position.

2. A molding apparatus in accordance with claim 1 wherein said bore includes a central portion with first and second axially opposite ends, a first end portion communicating with said first end of said central portion and with said vent, and a second end portion communicating with said second end of said central portion.

3. A molding apparatus in accordance with claim 2 wherein said valve housing includes a cylindrical member defining said central portion of said bore, a first end member fixed to said mold member and defining said first end portion of said bore, a second end member defining said second end portion of said bore, and means for fastening said first and second end members to said cylindrical member.

4. A molding apparatus in accordance with claim 2 wherein said valve member includes a central piston portion movably located in said central portion of said bore in sealing engagement therewith and including axially opposite first and second ends, a first end portion extending axially from said first end of said piston portion and movably located in said first end portion of said bore and in sealing engagement therewith, and a second end portion extending axially from said second end of said piston portion, movably located in said second end portion of said bore and in sealing engagement therewith, and including a reduced diameter portion communicating with said cleansing conduit outlet port and being selectively communicable with said vent discharge port and with said flushing discharge port.

5. A molding apparatus in accordance with claim 1 wherein said cleansing conduit includes a portion exterior to said valve housing.

6. A molding apparatus in accordance with claim 1 wherein said portion of said cleansing conduit is transparent and constitutes a sight tube.

7. A molding apparatus in accordance with claim 1 wherein said valve housing includes a cylindrical central member including opposite first and second ends and defining a portion of said bore, a first end member connected to said first end of said central member and including a bore, a bushing located in said bore of said first end member and defining a portion of said bore, a second end member connected to said second end of said central member and including a bore, and a bushing located in said bore of said second end member and defining a portion of said bore.

8. A molding apparatus in accordance with claim 1 wherein said means for displacing said valve member includes first and second fluid conduits respectively connected to said central portion of said bore and adjacent said opposite ends thereof, and valve means connected to said fluid conduits for selectively applying pressure fluid to the opposites sides of said central piston portion.

9. A molding apparatus in accordance with claim 1 wherein said cleansing conduit also includes a control connected to said venting and flushing valve for actuation thereof to the closed position, and a sensor connected to said control to cause said control to actuate said venting and flushing valve to the closed position in response to the arrival of resin in said cleansing conduit.

10. Molding apparatus comprising a mold member at least partially defining a mold cavity adapted to at least partially define an article to be molded and including a vent, a venting and flushing valve comprising a valve housing including a bore communicating with said vent, a vent discharge port communicating with said bore, and a flushing discharge port communicating with said bore, a venting and cleansing conduit including an inlet port communicating with said bore, an outlet port communicating with said bore, and a valve member located in said bore, including a flushing medium conduit extending axially therein and including an inlet port adapted to communicate with a source of flushing medium, and an outlet port communicating with said bore, and being operably moveable between a venting position wherein said vent communicates with said venting and cleansing conduit inlet port, wherein said venting and cleansing conduit outlet port communicates with said vent discharge port, wherein communication between said flushing medium outlet port and said venting and cleansing conduit inlet port is blocked, and wherein communication between said venting and cleansing conduit outlet port and said flushing discharge port is blocked, and a flushing position wherein said flushing medium outlet port communicates with said venting and cleansing conduit inlet port, wherein said venting and cleansing conduit outlet port communicates with said flushing discharge port, wherein communication between said vent and said venting and cleansing conduit inlet port is blocked, and wherein communication between said venting and cleansing conduit outlet port and said vent discharge port is blocked, and means for displacing said valve member between said venting position and said flushing position.

11. A molding apparatus in accordance with claim 10 wherein said bore includes a central portion with first and second axially opposite ends, a first end portion communicating with said first end of said central portion and with said vent, and a second end portion communicating with said second end of said central portion.

12. A molding apparatus in accordance with claim 11 wherein said valve housing includes a cylindrical member defining said central portion of said bore, a first end member fixed to said mold member and defining said first end portion of said bore, a second end member defining said second end portion of said bore, and means for fastening said first and second end members to said cylindrical member.

13. A molding apparatus in accordance with claim 11 wherein said valve member includes a central piston portion movably located in said central portion of said bore in sealing engagement therewith and including axially opposite first and second ends, a first end portion extending axially from said first end of said piston portion and movably located in said first end portion of said bore and in sealing engagement therewith, and a second end portion extending axially from said second end of said piston portion, movably located in said second end portion of said bore and in sealing engagement therewith, and including a reduced diameter portion communicating with said cleansing conduit outlet port and being selectively communicable with said vent discharge port and with said flushing discharge port.

14. A molding apparatus in accordance with claim 10 wherein said cleansing conduit includes a portion exterior to said valve housing.

15. A molding apparatus in accordance with claim 14 wherein said portion of said cleansing conduit is transparent and constitutes a sight tube.

16. A molding apparatus in accordance with claim 10 wherein said valve housing includes a cylindrical central member including opposite first and second ends and defining said central portion of said bore, a first end member connected to said first end of said central member and including a bore, a bushing located in said bore of said first end member and defining said first end portion of said bore, a second end member connected to said second end of said central member and including a bore, and a bushing located in said bore of said second end member and defining said second end portion of said bore.

17. A molding apparatus in accordance with claim 10 wherein said means for displacing said valve member includes first and second fluid conduits respectively connected to said central portion of said bore and adjacent said opposite ends thereof, and valve means connected to said fluid conduits for selectively applying pressure fluid to the opposites sides of said central piston portion.

18. A molding apparatus in accordance with claim 10 wherein said cleansing conduit also includes a control connected to said venting and flushing valve for actuation thereof to the closed position, and a sensor connected to said control to cause said control to actuate said venting and flushing valve to the closed position in response to the arrival of resin in said cleansing conduit.

19. Molding apparatus comprising a mold member at least partially defining a mold cavity adapted to at least partially define an article to be molded and including a vent, a venting and flushing valve comprising a valve housing including a bore having a central portion with first and second axially opposite ends, a first end portion communicating with said first end of said central portion and with said bore, and a second end portion communicating with said second end of said central portion, a valve member located in said bore and including a piston portion movably located in said central portion of said bore in sealing engagement therewith and including axially opposite first and second ends, a first end portion extending axially from said first end of said piston portion and movably located in said first end portion of said bore and in sealing engagement therewith, and a second end portion extending axially from said second end of said piston portion, movably located in said second end portion of said bore and in sealing engagement therewith, and including a reduced diameter part communicating with said cleansing conduit outlet port and being selectively communicable with said vent discharge port and said flushing discharge port, and a flushing medium conduit extending axially through said valve member and including an inlet port located in said second end part of said valve member, and adapted to communicate with a source of flushing medium, and an outlet port located in said first end portion of said valve member and communicating with said bore, said valve member being moveable between a venting position wherein said vent communicates with said vent and cleansing conduit inlet port, wherein said vent and cleansing conduit outlet port communicates with said vent discharge port, wherein communication between said flushing medium inlet port and said vent and cleansing conduit inlet port is blocked, and wherein communication between said vent and cleansing conduit outlet port and said flushing discharge port is blocked, and a flushing position wherein said flushing medium inlet port communicates with said vent and cleansing conduit inlet port, wherein said vent and cleansing conduit outlet port communicates with said flushing discharge port, wherein communication between said vent and said vent and cleansing conduit inlet port is blocked, and wherein communication between said vent and cleansing conduit outlet port and said vent discharge port is blocked, and means for displacing said valve member between said venting position and said flushing position.

20. A molding apparatus in accordance with claim 19 wherein said valve housing includes a cylindrical central member including opposite first and second ends and defining said central portion of said bore, a first end member connected to said first end of said central member and including a bore, a bushing located in said bore of said first end member and defining said first end portion of said bore, a second end member connected to said second end of said central member and including a bore, and a bushing located in said bore of said second end member and defining said second end portion of said bore.

21. A molding apparatus in accordance with claim 19 wherein said means for displacing said valve member includes first and second fluid conduits respectively connected to said central portion of said bore and adjacent said opposite ends thereof, and valve means connected to said fluid conduits for selectively applying pressure fluid to the opposites sides of said central piston portion.

\* \* \* \* \*